US009162657B2

(12) United States Patent
Li et al.

(10) Patent No.: US 9,162,657 B2
(45) Date of Patent: Oct. 20, 2015

(54) AUTOMOTIVE BRAKING SYSTEM

(75) Inventors: Yonghua Li, Detroit, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1692 days.

(21) Appl. No.: 12/488,990

(22) Filed: Jun. 22, 2009

(65) Prior Publication Data

US 2010/0320011 A1 Dec. 23, 2010

(51) Int. Cl.

| | |
|---|---|
| *B60T 13/66* | (2006.01) |
| *B60T 8/32* | (2006.01) |
| *B60T 1/10* | (2006.01) |
| *B60T 8/88* | (2006.01) |
| *B60W 10/08* | (2006.01) |
| *B60W 10/184* | (2012.01) |
| *B60W 30/18* | (2012.01) |
| *B60L 3/10* | (2006.01) |
| *B60L 7/18* | (2006.01) |
| *B60L 7/26* | (2006.01) |
| *B60K 1/00* | (2006.01) |
| *B60K 1/04* | (2006.01) |
| *B60S 1/08* | (2006.01) |
| *B60W 20/00* | (2006.01) |

(52) U.S. Cl.
CPC ............... B60T 8/3205 (2013.01); B60L 3/108 (2013.01); B60L 7/18 (2013.01); B60L 7/26 (2013.01); B60T 1/10 (2013.01); B60T 8/885 (2013.01); B60W 10/08 (2013.01); B60W 10/184 (2013.01); B60W 30/18127 (2013.01); *B60K 1/00* (2013.01); *B60K 1/04* (2013.01); *B60K 2001/0416* (2013.01); *B60L 2240/662* (2013.01); *B60L 2240/667* (2013.01); *B60S 1/08* (2013.01); *B60T 2270/604* (2013.01); *B60W 20/00* (2013.01); *B60W 2550/12* (2013.01); *Y02T 10/7291* (2013.01); *Y02T 90/16* (2013.01)

(58) Field of Classification Search
CPC ........................... B60T 13/66; B60K 31/0066
USPC .............. 180/65.21, 65.245, 65.265, 65.285; 303/139, 146, 147, 152, 177; 701/70–72, 78, 79
See application file for complete search history.

(56) References Cited

U.S. PATENT DOCUMENTS

| | | | |
|---|---|---|---|
| 5,615,933 | A | 4/1997 | Kidston et al. |
| 5,929,534 | A | 7/1999 | Pickett |
| 6,033,041 | A | 3/2000 | Koga et al. |
| 6,163,747 | A | 12/2000 | Matsuno |
| 6,275,763 | B1 | 8/2001 | Lotito et al. |
| 6,409,289 | B2 * | 6/2002 | Wagner et al. ................ 303/191 |
| 6,470,731 | B1 | 10/2002 | Rieth |
| 6,709,075 | B1 | 3/2004 | Crombez et al. |
| 6,988,779 | B2 | 1/2006 | Amanuma et al. |
| 7,122,979 | B2 | 10/2006 | Wilton et al. |
| 7,152,934 | B2 | 12/2006 | Führer et al. |
| 7,232,192 | B2 | 6/2007 | Teslak et al. |

(Continued)

*Primary Examiner* — Christopher Schwartz
(74) *Attorney, Agent, or Firm* — David B. Kelley; Brooks Kushman P.C.

(57) ABSTRACT

An automotive braking system includes a windshield wiper system, a traction wheel, and a non-friction brake system configured to apply a braking force to the traction wheel. The system also includes one or more controllers operatively connected with the windshield wiper system, and configured to, in response to a braking request, command the non-friction brake system to apply the braking force to the traction wheel. The braking force has a magnitude that depends on whether the windshield wiper system is active.

18 Claims, 2 Drawing Sheets

(56) References Cited

U.S. PATENT DOCUMENTS

| | | | |
|---|---|---|---|
| 2005/0218718 A1* | 10/2005 | Iwatsuki et al. | 303/177 |
| 2006/0022846 A1 | 2/2006 | Tummala | |
| 2006/0190158 A1* | 8/2006 | Shiiba et al. | 701/70 |
| 2006/0220453 A1 | 10/2006 | Saito et al. | |
| 2007/0018499 A1 | 1/2007 | Kokubo et al. | |
| 2007/0046099 A1 | 3/2007 | Matsuura et al. | |
| 2007/0050121 A1 | 3/2007 | Ammon et al. | |

* cited by examiner

AUTOMOTIVE BRAKING SYSTEM

BACKGROUND

U.S. Patent Application Number 2007/0046099 to Matsuura et al. provides a vehicle brake system for controlling the frictional braking force and the regenerative braking force applied to a wheel of a vehicle. The brake system reduces the regenerative braking force to a predetermined force, and keeps the regenerative braking force at the predetermined force before the start of anti-lock control. When the anti-lock control starts, the brake system decreases the regenerative braking force from the predetermined force.

U.S. Pat. No. 6,988,779 to Amanuma et al. provides that during regenerative braking of a vehicle, the distribution ratio of regenerative braking forces to first and second motors/generators is controlled to become an ideal distribution ratio corresponding to a longitudinal acceleration (deceleration) of the vehicle. The distribution ratio of the braking forces to front and rear wheels can be maintained at an optimal value during rapid deceleration as well as during slow deceleration of the vehicle to improve braking performance.

U.S. Pat. No. 6,275,763 to Lotito et al. provides a regenerative braking system that operates at a first effective rate of applied regenerative braking force upon application of a brake pedal at an ambient temperature above a desired temperature, and operates at a second, lower effective rate of applied regenerative braking force at an ambient temperature below a desired temperature. Upon activation of an anti-lock braking system, the applied regenerative braking force is reduced at a first predetermined rate when the ambient temperature is above a desired temperature, and the regenerative braking force is reduced at a second, faster predetermined rate when the ambient temperature is below a desired temperature.

SUMMARY

An automotive braking system includes a windshield wiper system, a traction wheel, and a non-friction brake system configured to apply a braking force to the traction wheel. The system also includes one or more controllers operatively connected with the windshield wiper system, and configured to, in response to a braking request, command the non-friction brake system to apply the braking force to the traction wheel. The braking force has a magnitude that depends on whether the windshield wiper system is active.

An automotive braking system includes a rain sensor, a traction wheel, and a non-friction brake system configured to apply a braking force to the traction wheel. The system also includes one or more controllers operatively connected with the rain sensor, and configured to, in response to a braking request, command the non-friction brake system to apply the braking force to the traction wheel. The braking force has a magnitude that depends on whether the rain sensor senses rain.

An automotive braking system includes a traction wheel, a non-friction brake system configured to apply a braking force to the traction wheel, and one or more controllers. The one or more controllers are configured to process weather information and to, in response to a braking request, command the non-friction brake system to apply the braking force to the traction wheel. The braking force has a magnitude that depends on the weather information.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
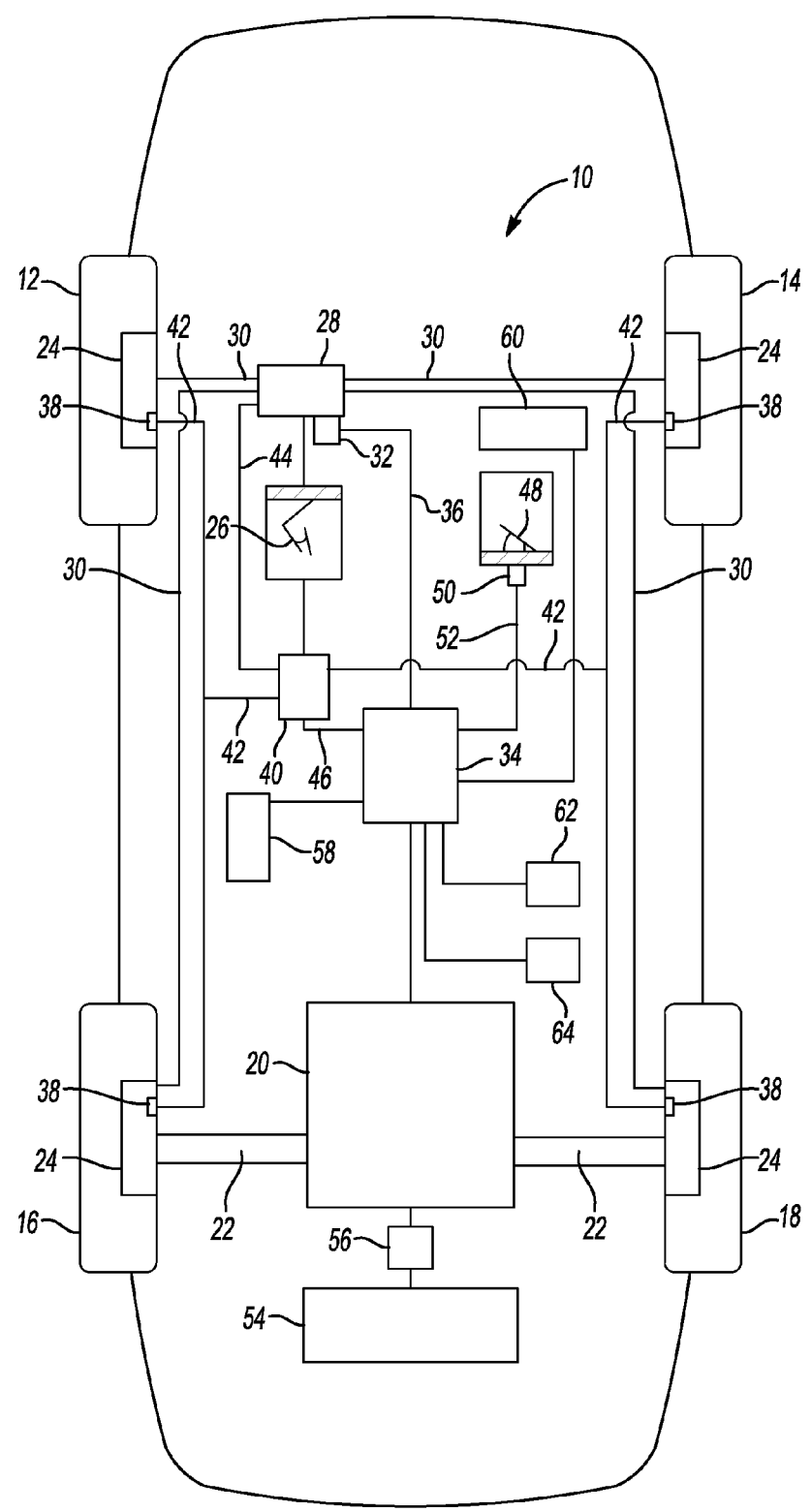
FIG. 1 is a block diagram of an embodiment of an automotive vehicle.

Referring now to FIG. 1, a motor vehicle 10 may have a plurality of traction wheels 12, 14, 16, 18 for operation upon a road surface. An electric machine 20 is provided as the drive motor for driving the rear traction wheels 16 and 18 through drive shafts 22. In other embodiments, an internal combustion engine may also drive the traction wheels 12, 14, 16, 18 (depending on the configuration). Other arrangements are also possible.

Each of the traction wheels 12, 14, 16, 18 may be provided with a conventional friction brake 24 applied upon actuation of a service brake pedal 26 by the vehicle operator. A friction brake master cylinder 28 provides hydraulic pressure to each of the friction brakes 24 via hydraulic lines 30. A brake pressure sensor 32 is also provided, as is known, to indicate to a regenerative brake controller 34, via line 36, when the vehicle friction brake system has been activated. Each of the traction wheels 12, 14, 16, 18 may also be provided with a sensor 38 (speed sensor) for detecting traction wheel slippage manifested, for example, as sudden or rapid angular deceleration of any of the traction wheels 12, 14, 16, 18. The sensors 38 communicate with an anti-lock brake system ("ABS") controller 40 via lines 42.

In the event that the sensors 38 detect slippage in one or more of the traction wheels 12, 14, 16, 18 upon application of the friction brakes 24, the ABS controller 40 may signal the master cylinder 28 (or some other adapted controlling device), via line 44, to intermittently apply a braking force to the traction wheels 12, 14, 16, 18. The ABS controller 40 may also send a signal via line 46 to the regenerative brake controller 34 to indicate the presence of an ABS event.

As is commonly known, anti-lock braking devices are widely used to improve vehicle handling and performance on low friction road surfaces, such as road surfaces covered by snow, ice or water. While the ABS controller 40 and the regenerative brake controller 34 are independent of one another in the embodiment of FIG. 1, the ABS controller 40 could be directed by the regenerative brake controller 34 in other embodiments. Other arrangements are also possible.

The electric motor 20 may also be employed to assist in vehicle braking. Each braking event normally begins with the vehicle operator deactivating an accelerator pedal 48. A throttle position sensor 50 detects this release of throttle application through the change in throttle position, and transmits this information to the regenerative braking controller 34 via line 52. (The term throttle (position or sensor) and accelerator (pedal or sensor) are used interchangeably herein.) The regenerative braking controller 34 then terminates current flow from a battery 54 to the electric motor 20 via a current flow regulator 56. The regenerative braking controller 34 also reverses the operation of the electric motor 20 by reversing current flow to a preset current flow, to recharge the battery 54—a process also known as compression regenerative braking. This reversal of current flow induces a first, relatively low level braking force to the driven traction wheels 16, 18. Upon application of the brake pedal 26, the current flow from the electric motor 20 to the battery 54 is increased significantly, thus providing additional braking effort as a supplement to the friction brakes 24 discussed above, while further recharging the battery 54. This is known as service brake regeneration ("SBR"). Of course, other non-friction brake systems may also be used. For example, a flywheel, hydraulics, pneumatics, wheel-end motors, etc. may be arranged in a known fashion to supply a non-friction braking force to at least one of the traction wheels 12, 14, 16, 18.

In certain vehicles including friction brake and service brake regeneration systems, issues may arise when anti-lock braking systems are employed. In the event that the friction brakes 24 are applied in wet driving conditions, any traction wheel that experiences rapid wheel angular deceleration may be detected by at least one of the sensors 38. The ABS controller 40 therefore may initiate anti-lock modulation of the friction braking system to provide improved vehicle control. If the service brake regeneration system is still operative, the efforts of the anti-lock braking system to provide an intermittent braking force and the desired vehicle control may be confounded. Accordingly, these systems may deactivate or quickly reduce service brake and/or compression regeneration during an anti-lock braking system event.

In wet weather, where actual traction wheel slippage is more likely to occur, the above strategy may be necessary. This strategy, however, may produce undesirable harsh driving events. These harsh driving events may particularly arise when the driving traction wheels hop or bounce relative to the road surface (where the traction wheel loses contact with the road surface-also known as wheel bump-activation). If the friction brakes 24 are applied during such an event, at least one of the sensors 38 may detect rapid angular deceleration of the airborne traction wheel. This may be interpreted by the ABS controller 40 as traction wheel skidding, resulting in the initiation of anti-lock control and possible termination of the service brake and/or compression regeneration. The abrupt reduction of the current flow from the electric motor 20 to the battery 54, also known as a high slew-out rate, may magnify the undesirable harsh driving events during wheel bump-activation.

Objectionable wheel bump-activation harshness may be reduced by adoption of a control strategy that compensates for wet conditions. Wet conditions may be determined through any of several techniques. For example, a rain sensor 58 operatively connected with the controller 34 may detect the presence of rain on the vehicle 10 (implying wet road conditions), and/or a window wiper system 60 operatively connected with the controller 34 may generate signals indicating that the window wipers are on (implying wet road conditions-provided that, in certain embodiments, the window wipers are on for some minimum period of time to avoid a determination of wet road conditions when the windshield is merely being cleaned). The controller 34 may also prompt the driver to provide, via any suitable interface, input indicative of local driving conditions, etc.

Alternatively, the controller 34 may periodically request local weather information, in a known fashion, from the Internet, via, for example, a cellular transceiver 62 (or Wi-Fi connection, etc.) based on the location of the vehicle 10 as determined by a navigation system 64. A history of weather information may be used to determine whether (or to what degree) there are wet driving conditions. As an example, the longer the local weather information has indicated rain, the wetter the road is assumed to be. As another example, weather information including rain fall amounts may be averaged (e.g., weighted-averaged) to determine to what degree there are wet driving conditions. Local temperatures may be used to determine whether there are icy conditions. As an example, if local temperatures are below 32° F., the road is assumed to be icy, etc. Other suitable techniques may also be used.

Figure 2:
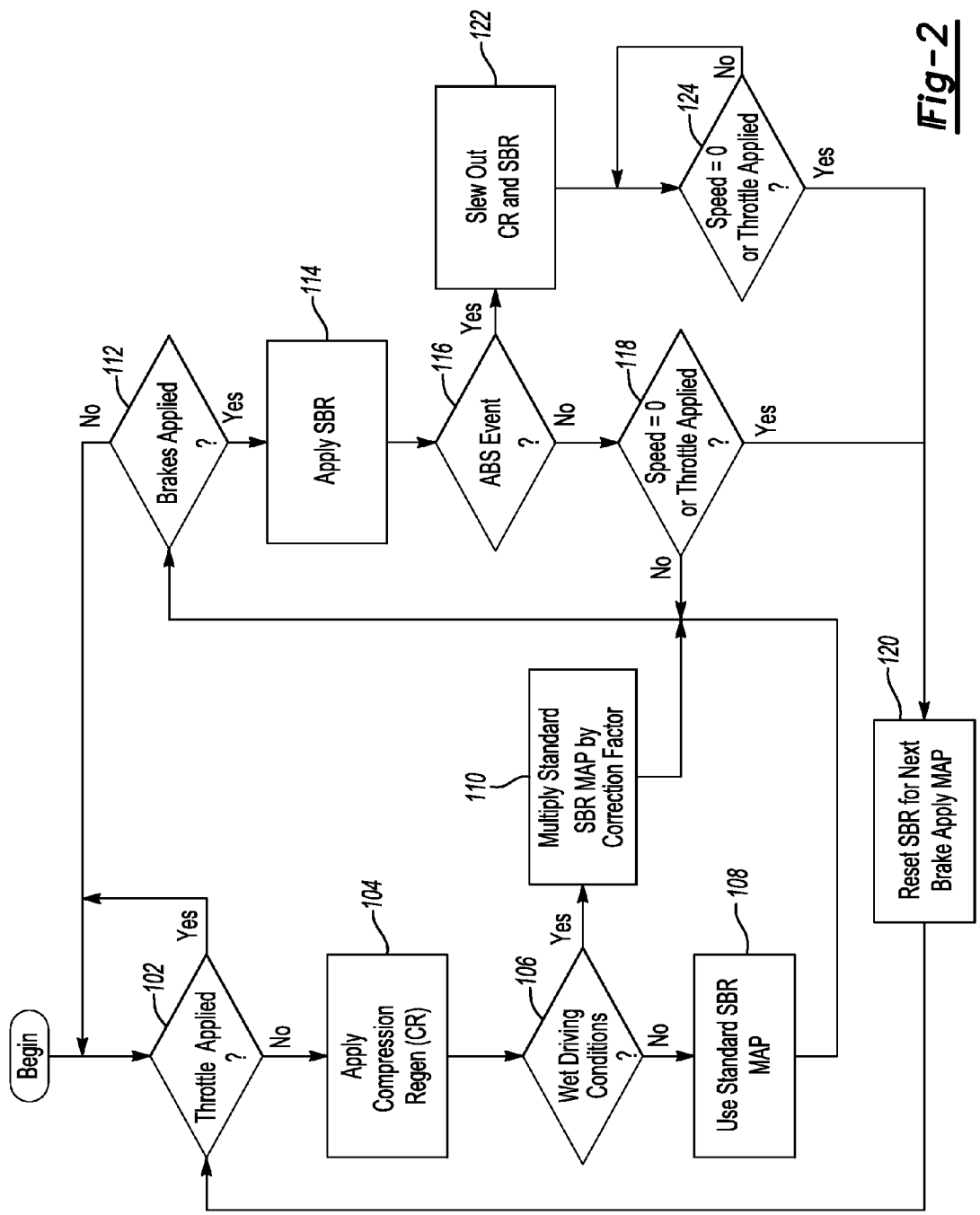
FIG. 2 is a flow chart depicting an example control algorithm for a regenerative braking system.

Referring now to FIGS. 1 and 2, the throttle position sensor 50 detects the throttle position and determines if the throttle 48 is applied or released as indicated at 102. The regenerative brake controller 34 applies compression regeneration, as indicated at 104, if the throttle 48 is released. As indicated at 106, the regenerative brake controller 34 determines whether there are wet (or icy, etc.) driving conditions as described above. If no, a standard service brake regeneration map applies as indicated at 108. If yes, a modified service brake regeneration map applies as indicated at 110. (As known in the art, the standard service brake regeneration map may be generated via testing, simulation, etc. As also known in the art, service brake regeneration may be determined or calculated from a plurality of operating conditions such as vehicle operator inputs, propulsion and energy system capabilities, and drivability limitations.)

In the embodiment of FIG. 2, the standard service brake regeneration map may be modified by multiplying it with a correction factor, e.g., 0.1, 0.5, etc., derived via, for example, vehicle testing or simulation. The correction factor may be a single value in embodiments where driving conditions are represented in binary fashion: not wet/wet. Alternatively, the correction factor may take on discrete or continuous values in embodiments where wet driving conditions are represented by degree of wetness: not wet/somewhat wet/very wet/etc. (The speed of the window wiper system 60, for example, may be indicative of the degree of wetness). The correction factor may decrease as the degree of wetness increases. As a result, the magnitude of the regenerative braking force applied by the electric machine 20 may decrease as the degree of wetness increases. In other embodiments, different mappings may be used depending on the determined driving conditions. Other scenarios are also possible.

As indicated at 112, the regenerative brake controller 34 determines whether the brakes 24 are being applied. If yes, the service brake regeneration is applied, as indicated at 114, according to the appropriate map discussed with reference to 108 and 110. As indicated at 116, the ABS controller 40 monitors the sensors 38 to determine if an anti-lock braking event is occurring. If no, the brake controller 34 determines, as indicated at 118, whether the vehicle 10 has come to a complete stop or if the accelerator pedal 48 has been activated (either event indicating that the braking event has ended). If yes, the service regeneration map is reset as indicated at 120.

Returning again to 116, if yes, the ABS controller 40 determines an appropriate slew-out rate or rate of regeneration current reduction in any suitable fashion as indicated at 122. As indicated at 124, the brake controller 34 determines whether the vehicle 10 has come to a complete stop or if the accelerator pedal 48 has been activated. If yes, the strategy proceeds to 120.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive braking system comprising:
   a windshield wiper system;
   a traction wheel;
   a non-friction brake system configured to apply a braking force to the traction wheel; and one or more controllers (i) operatively connected with the windshield wiper system, and (ii) configured to, in response to a braking request, command the non-friction brake system to apply the braking force to the traction wheel at a magnitude that depends on an activation state of the windshield wiper system such that wheel bump-activation harshness is reduced during wet conditions.

2. The system of claim 1 wherein the magnitude further depends on a speed of the windshield wiper system.

3. The system of claim 2 wherein the magnitude decreases as the speed of the windshield wiper system increases.

4. The system of claim 1 wherein the magnitude further depends on a period of time during which the windshield wiper system has been active.

5. The system of claim 1 wherein the magnitude, if the windshield wiper system is active, is less than the magnitude if the windshield wiper system is not active.

6. The system of claim 1 further comprising a friction brake system configured to apply another braking force to the traction wheel.

7. The system of claim 1 wherein the non-friction brake system includes at least one of an electric machine, flywheel and wheel end motor.

8. An automotive braking system comprising:
a rain sensor;
a traction wheel;
a non-friction brake system configured to apply a braking force to the traction wheel; and
one or more controllers (i) operatively connected with the rain sensor, and (ii) configured to, in response to a braking request, command the non-friction brake system to apply the braking force to the traction wheel at a magnitude that depends on an activation state of the rain sensor such that wheel bump-activation harshness is reduced during wet conditions.

9. The system of claim 8 wherein the magnitude, if the rain sensor senses rain, is less than the magnitude if the rain sensor does not sense rain.

10. The system of claim 8 further comprising a friction brake system configured to apply another braking force to the traction wheel.

11. The system of claim 8 wherein the non-friction brake system includes at least one of an electric machine, flywheel and wheel end motor.

12. An automotive braking system comprising:
a traction wheel;
a non-friction brake system configured to apply a braking force to the traction wheel; and
one or more controllers configured to (i) process weather information and (ii) in response to a braking request, command the non-friction brake system to apply the braking force to the traction wheel at a magnitude that depends on the weather information such that wheel bump-activation harshness is reduced during wet conditions.

13. The system of claim 12 wherein the magnitude, if the weather information indicates rain in a vicinity of the automotive braking system, is less than the magnitude if the weather information indicates a lack of rain in the vicinity of the automotive braking system.

14. The system of claim 12 wherein the magnitude, if the weather information is indicative of a temperature less than a predetermined temperature, is less than the magnitude if the weather information is indicative of a temperature greater than the predetermined temperature.

15. The system of claim 12 wherein the magnitude further depends on a period of time during which the weather information has indicated rain in a vicinity of the automotive braking system.

16. The system of claim 12 further comprising a friction brake system configured to apply another braking force to the traction wheel.

17. The system of claim 12 wherein the non-friction brake system includes at least one of an electric machine, flywheel and wheel end motor.

18. The system of claim 12 further comprising a receiver configured to receive the weather information.

* * * * *